(12) United States Patent
Chen et al.

(10) Patent No.: US 9,641,661 B2
(45) Date of Patent: May 2, 2017

(54) METHOD AND APPARATUS TO ESTABLISH A COMMUNICATION CONNECTION

(75) Inventors: Larry Chen, Oakland, CA (US); Manisha Parekh, Mountain View, CA (US); Peter Fry, Andover, MA (US); Radha Neelakantan, Medford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1186 days.

(21) Appl. No.: 11/963,022

(22) Filed: Dec. 21, 2007

(65) Prior Publication Data

US 2009/0161633 A1 Jun. 25, 2009

(51) Int. Cl.
*H04B 7/216* (2006.01)
*H04M 1/725* (2006.01)
*H04M 1/2745* (2006.01)

(52) U.S. Cl.
CPC ..... *H04M 1/72522* (2013.01); *H04M 1/2745* (2013.01); *H04M 1/72563* (2013.01); *H04M 1/27455* (2013.01); *H04M 1/274508* (2013.01)

(58) Field of Classification Search
CPC .......... H04M 1/2745; H04M 1/72563; H04M 1/72522; H04M 1/274508; H04M 1/27455
See application file for complete search history.

(56) References Cited

U.S. PATENT DOCUMENTS

| 5,579,472 | A | 11/1996 | Keyworth et al. |
| 6,131,028 | A | 10/2000 | Whitington |
| 6,624,750 | B1 * | 9/2003 | Marman et al. ............. 340/506 |
| 6,937,713 | B1 * | 8/2005 | Kung et al. ............. 379/211.02 |
| 7,231,229 | B1 | 6/2007 | Hawkins et al. |
| 7,519,165 | B1 * | 4/2009 | Rodkey et al. ............. 379/88.12 |
| 7,787,609 | B1 * | 8/2010 | Flockhart et al. ....... 379/265.01 |
| 2002/0191639 | A1 * | 12/2002 | Norby ........................... 370/466 |
| 2004/0268265 | A1 | 12/2004 | Berger |
| 2005/0130641 | A1 * | 6/2005 | Lorraine Scott .. H04M 1/72563 455/418 |
| 2005/0221821 | A1 * | 10/2005 | Sokola et al. ............. 455/432.3 |
| 2005/0251555 | A1 | 11/2005 | Little et al. |
| 2006/0135142 | A1 | 6/2006 | Repka |
| 2006/0285538 | A1 * | 12/2006 | Oommen ....................... 370/356 |
| 2007/0035513 | A1 | 2/2007 | Sherrard et al. |
| 2007/0047697 | A1 * | 3/2007 | Drewry et al. ............ 379/88.13 |

(Continued)

FOREIGN PATENT DOCUMENTS

CN 1540881 10/2004
WO WO-2009085892 A1 7/2009

OTHER PUBLICATIONS

EPO, Extended Search Report dated Nov. 30, 2012, EP Pat App No. 08866288.7, filed Dec. 18, 2008.

(Continued)

*Primary Examiner* — Luat Phung
(74) *Attorney, Agent, or Firm* — Norton Rose Fulbright US LLP (57) ABSTRACT

Various embodiments are directed to a mobile computing device having a communication management module. The communication management module receives connection information from a destination device, the connection information representing at least one communication mode accepted by the destination device. Other embodiments are described and claimed.

14 Claims, 4 Drawing Sheets

800

RECEIVE CONNECTION INFORMATION WITH AT LEAST ONE COMMUNICATION MODE ACCEPTED BY A DESTINATION DEVICE
502

DISPLAY THE COMMUNICATION MODE WITH A CONNECTION PRIORITY INFORMATION INDICATOR REPRESENTING A PRIORITY LEVEL FOR THE COMMUNICATION MODE
504

(56) References Cited

U.S. PATENT DOCUMENTS

2007/0192411 A1     8/2007   Himmelstein
2008/0148154 A1*   6/2008   Burrell ................ H04L 12/1895
                                                                        715/733

OTHER PUBLICATIONS

European Search Report—EP14157690—Search Authority—Munich—Jul. 31, 2014.

* cited by examiner

RECEIVE CONNECTION INFORMATION WITH AT LEAST ONE COMMUNICATION MODE ACCEPTED BY A DESTINATION DEVICE
502

DISPLAY THE COMMUNICATION MODE WITH A CONNECTION PRIORITY INFORMATION INDICATOR REPRESENTING A PRIORITY LEVEL FOR THE COMMUNICATION MODE
504

METHOD AND APPARATUS TO ESTABLISH A COMMUNICATION CONNECTION

BACKGROUND

A mobile computing device such as a combination handheld computer and mobile telephone or smart phone generally may provide voice and data communications functionality, as well as computing and processing capabilities. For example, a mobile computing device may support cellular communication over cellular network such as a Code Division Multiple Access (CDMA) network as well as Evolution Data Optimized (EVDO) data communication over a wireless radio channel. A design consideration for mobile computing devices having such robust functionality, however, is establishing communication connections with other computing devices having equally robust functionality. Demands for establishing communication connections with other computing devices quickly and successfully are important considerations for mobile computing devices. Consequently, there exists a substantial need for techniques to establish communication connections.

DETAILED DESCRIPTION

Various embodiments may be generally directed to a method and apparatus to establish a communication connection. In one embodiment, for example, a mobile computing device may comprise a communication management module to receive connection information from a destination device. The connection information may comprise at least one communication mode accepted by the destination device with each communication mode having a connection priority information indicator representing priority levels for various communication modes accepted by the destination device. The priority levels may be determined using the connection information. In this manner, a mobile computing device may be able to determine a priority level for each available communication mode to aid a user in selecting a communication mode. Alternatively or additionally, the mobile computing device may be arranged to automatically select a communication mode in accordance with a user-defined or default set of preferences or rules, such as a communication mode with a highest likelihood of establishing a successful communication connection. Other embodiments are described and claimed.

Current solutions require a user to manually attempt to initiate communication with a destination device by attempting each available communication mode for a particular destination device one at a time. For example, a particular destination device may be capable of communicating through use of a cellular telephone number, instant messaging address or an email address. Using current solutions, a user attempting to establish communication with this destination device would be required to try each of these communication modes one at a time until a communication connection is established. Arranging communication modes according to connection priority information to allow a manual selection of a high priority communication mode or automatically selecting a high priority communication mode would simplify this process and reduce inefficiencies associated with current solutions. As the number of computing devices and the number of communication modes accepted by computing devices continues to increase, the difficulty in successfully establishing a communication connection with a desired destination device will also continue to increase. Therefore, various embodiments are directed to techniques to establish communication connections.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
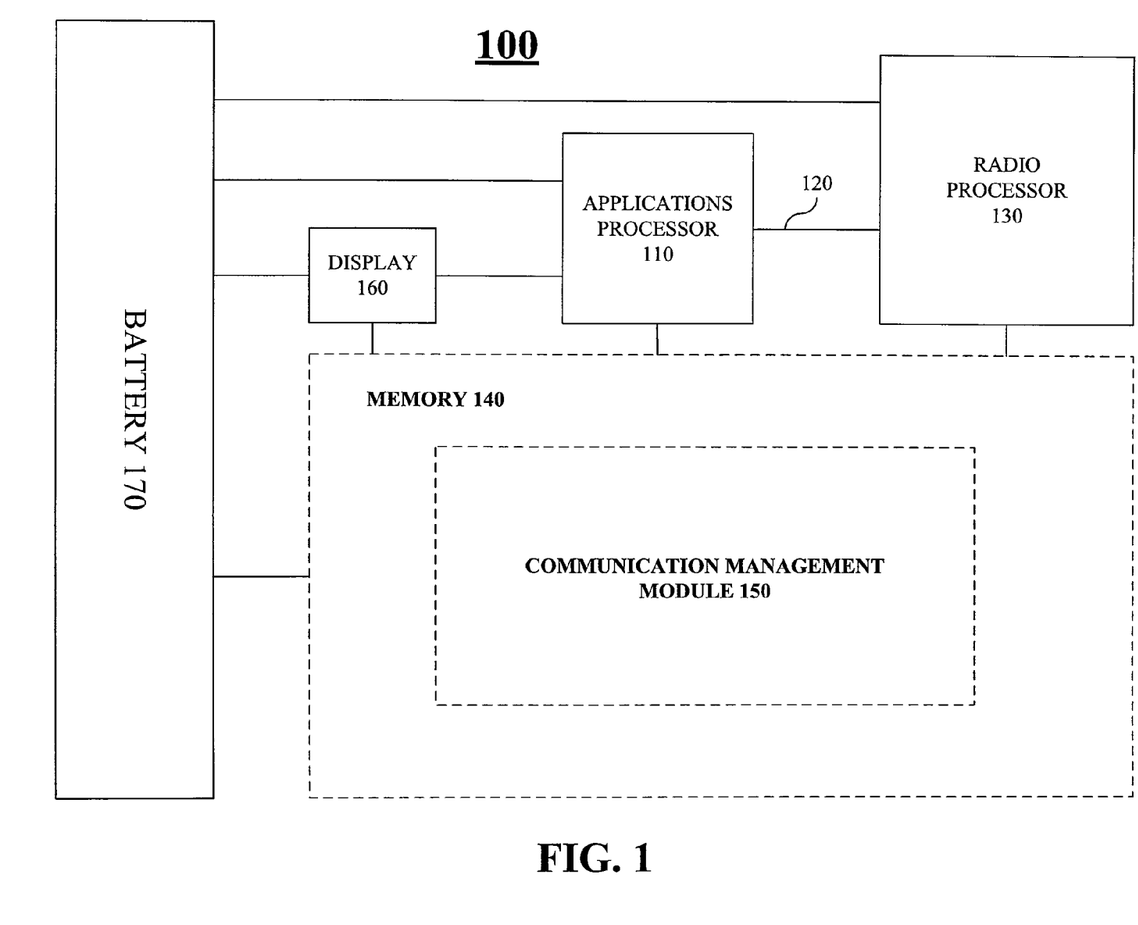
FIG. 1 illustrates a mobile computing device in accordance with one or more embodiments.

FIG. 1 illustrates one embodiment of a mobile computing device 100. The mobile computing device 100 may be configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

In the illustrated embodiment shown in FIG. 1, the mobile computing device 100 may include an applications processor 110 and a radio processor 130, with the processors 110, 130 connected or coupled by a signal line 120. The mobile computing device 100 may further include a memory unit 140. The memory unit 140 may store or implement, among other software modules, a communication management module 150. The mobile computing device 100 may also include a display 160. The applications processor 110, the radio processor 130, the memory 140 and the display 160 may all be coupled to a portable or self-contained power supply, such as a battery 170. It may be appreciated that the illustrated embodiment of the mobile computing device 100 as shown in FIG. 1 includes a limited number of elements for purposes of clarity and not limitation. A more detailed block diagram for the mobile computing device 100 may be described with reference to FIG. 9.

The mobile computing device 100 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 100 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 100 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 400 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

The mobile computing device 100 may comprise or implement a communication management module 150. Communication management module 150 may comprise, for example, hardware and/or software such as communication management control logic (e.g., instructions, data, and/or code) to be executed by a logic device (e.g., host or applications processor 110). The logic may be stored internally or externally to the logic device on one or more types of computer-readable storage media. In one or more embodiments, the communication management module 150 may be implemented as one or more communication management application programming interface (API) commands on the applications processor 110. In some cases, however, the communication management module 150 may be implemented or directly coupled to the radio processor 130. This may be advantageous, for example, when the mobile computing device 100 utilizes only a single processor. The embodiments are not limited in this context.

When enabled, the communication management module 150 may be arranged to receive connection information from a destination device. In various embodiments the destination device may comprise a second mobile computing device or any other device capable of establishing a communication connection with mobile computing device 100. The connection information received from the destination device may comprise at least one communication mode accepted by the destination device. In various embodiments the communication modes accepted by the destination device may include a cellular radiotelephone connection, voice connection, data connection, email connection, instant message (IM) connection, chat connection, group chat connection, short message service (SMS) connection, multimedia message service (MMS) connection, data connection, personal area network (PAN) connection, local area network (LAN) connection, metropolitan area network (MAN) connection, or wide area network (WAN) connection.

In various embodiments, the communication management module 150 displays the at least one communication mode on a display 160 of the mobile computing device 100. The display 160 may comprise any suitable visual interface for displaying content to a user of the mobile computing device 100. In one embodiment, for example, the display 160 may be implemented by a LCD such as a touch-sensitive color (e.g., 16-bit color) thin-film transistor (TFT) LCD screen. In some embodiments, the touch-sensitive LCD may be used with a stylus and/or a handwriting recognizer program.

In various embodiments, the communication management module 150 displays multiple communication modes on a display 160 of the mobile computing device 100. Each communication mode displayed on the display 160 may have a connection priority information indicator representing a priority level for the communication mode. Priority levels may refer to a determined level of acceptance of a communication mode determined using the connection information received from the destination device. The mobile computing device 100 may, for example, receive connection information from the destination device indicating that a cellular radiotelephone connection would likely be accepted, a SMS connection may or may not be accepted and an email connection would not be accepted at a given time. In this example, the cellular radio telephone connection mode would be assigned a higher priority level than the SMS connection mode and the SMS connection mode would be assigned a higher priority level than the email connection mode. The priority levels may be set or programmed by a user. The priority levels may also be set or programmed automatically by the communication management module 150 in accordance with a number or preferences, rules or heuristics.

In various embodiments, the connection information used to determine the level of acceptance of a communication mode may include the location of the destination device determined using GPS or cellular triangulation, the time zone of the destination device, the status of the ringer switch on the destination device, existing connections between the destination device and peripherals such as a personal computer or a Bluetooth headset, various channel characteristics such as received signal strength indication (RSSI), available wireless resources (e.g., GSM system, GPRS system, etc.), calendar information of the destination device, or other factors. For example, if the calendar information of the destination device indicates that the user of the destination device is currently in a meeting, this information may be included in the communication information and may indicate that the only currently acceptable communication mode is an email connection. The communication information may indicate that the destination device is currently connected to a Bluetooth headset. This information may indicate that the communication mode most likely to be accepted by the destination device is a cellular connection because the user of the destination device may be in her car. The communication information may indicate that the destination device is currently located at the office of the user based on the GPS location of the destination device. This information may indicate that the communication mode most likely to be accepted by the destination device is an instant message connection because the user of the destination device may be in her office.

Connection priority information indicators may comprise any element or character capable of indicating the priority level of a communication mode. For example, in various embodiments connection priority information indicators may comprise or be implemented as different colored, sized, bold or italicized shapes, icons, symbols, numbers, letters, strikethroughs or underlines. For example, a green dot may indicate that a communication mode will be accepted by a destination device, a yellow dot may indicate that a communication mode may or may not be accepted by a destination device, and a red dot may indicate the a communication mode will not be accepted by a destination device.

The at least one communication mode may be arranged on the display 160 of mobile computing device 100 according to connection priority information determined using the connection information. The connection priority information may represent priority levels for various communication modes accepted by the destination device. In various embodiments, communication modes may be arranged in an order based on the connection information received from the destination device. In the example above, the cellular radio telephone connection information may be arranged at the top of the display, the SMS connection information may be listed below the cellular radio telephone connection information and the email connection information may be listed below the SMS connection information. In this manner, a user of mobile computing device 100 is able to quickly ascertain the priority levels of the various communication modes based on their arrangement on display 160.

In various embodiments, the communication management module 150 may initiate communication with the destination device in response to operator instructions selecting a communication mode. For example, a user of mobile computing device may select a communication mode for a destination device using display 160. The type of communication connection established between mobile computing device 100 and the destination device may vary based on the type of communication mode selecting by the user.

The communication management module 150 may be arranged to automatically select a communication mode and initiate communication with the destination device based on the automatic selection. The automatic selection may be a selection of a communication mode with a highest priority determined from the connection priority information. For example, a user of mobile computing device 100 may select a destination device and indicate that a communication connection is desired with the destination device. Using the connection priority information, communication management module 150 may automatically select a communication mode with a highest priority and initiate communication with the destination device using the selected communication mode.

In various embodiments, the communication management module 150 may be configured to automatically attempt to initiate communication with the destination device using different communication modes until a communication connection is established. In this manner, the mobile computing device will repeatedly attempt to initiate communication with the destination until a successful connection is established or until each available communication mode has been attempted. The order of attempted communication modes may be determined using the connection priority information. This approach allows a user to simply select a desired destination device and allow the mobile computing device 100 to perform the necessary steps to find the appropriate communication mode that is currently being accepted at the destination device.

In various embodiments, the mobile computing device 100 may include an application program operative to manage and display contact information. The contact information may include connection information having various communication modes accepted by the destination device. Each communication mode displayed in the application program may also have a connection priority information indicator representing a priority level for the communication mode. An example application program may be a contact management program such as Microsoft Outlook®. In various embodiments, the mobile computing device 100 may include a graphic user interface (GUI) to display a GUI view with multiple communication modes on a display of the mobile computing device. In the GUI view, each communication mode may be displayed with a connection priority information indicator representing a priority level for the communication mode.

Figure 2:
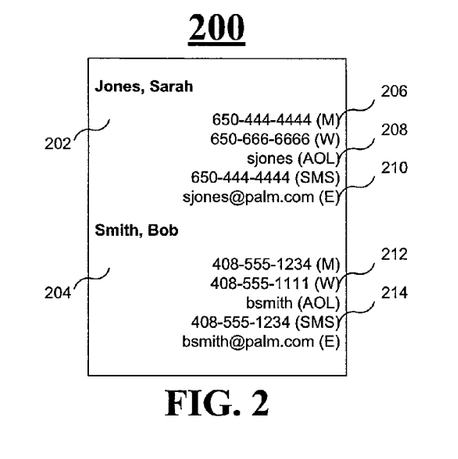
FIG. 2 illustrates a first embodiment of displayed contact information.

FIG. 2 illustrates a first embodiment of displayed contact information. FIG. 2 illustrates displayed contact information 200. As shown in FIG. 2, displayed contact information 200 may comprise at least one contact 202, 204. Displayed contact information 200, for example, contains contact information for Sarah Jones 202 and Bob Smith 204. The displayed contact information 200 includes at least one communication mode for each contact 202, 204. Displayed contact information 200 includes, for example, a cellular radiotelephone communication mode 206, an instant messaging communication mode 208, an email communication mode 210, an office telephone communication mode 212 and an SMS communication mode 214. While a limited number of contacts and communication modes are shown by way of example, it will be apparent to persons skilled in the relevant art that any number of contacts and communication mode can be used without departing from the spirit and scope of the embodiments.

Figure 3:
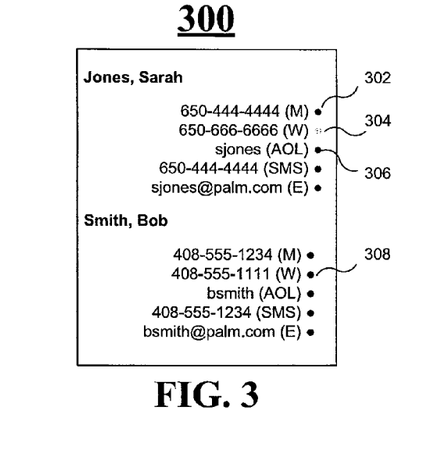
FIG. 3 illustrates a second embodiment of displayed contact information.

FIG. 3 illustrates a second embodiment of displayed contact information. FIG. 3 illustrates displayed contact information 300. As shown in FIG. 3, displayed contact information 300 may be similar to and representative of displayed contact information 200. Displayed contact information 300 may further comprise connection priority information indicators 302, 304, 306 and 308. Connection priority information indicators 302, 304, 306 and 308 may comprise different colored icons representing a priority level for the designated communication mode. For example, connection priority information indicator 302 may comprise a green icon indicating that the cellular radiotelephone communication mode for Sarah Jones has a high priority. Connection priority information indicator 304 may comprise a yellow icon indicating that Sarah Jones may or may not be available at her office telephone communication mode. Connection priority information indicator 306 may comprise a red icon indicating that Sarah Jones is currently not available through her instant messaging communication mode. Connection priority information indicator 308 may comprise a black icon indicating that connection information for Bob Smith has not been received at the mobile computing device. For example, Bob Smith may be using a destination device that is not compatible with the various embodiments described herein.

Figure 4:
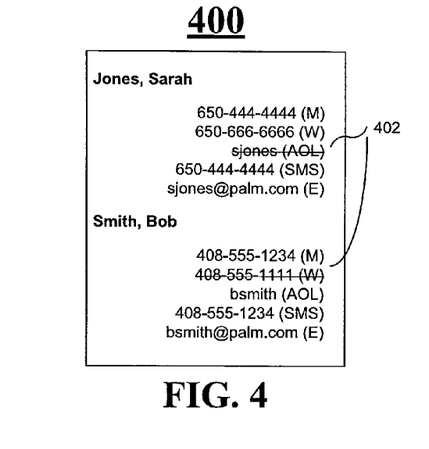
FIG. 4 illustrates a third embodiment of displayed contact information.

FIG. 4 illustrates a third embodiment of displayed contact information. FIG. 4 illustrates displayed contact information 400. As shown in FIG. 4, displayed contact information 400 may be similar to and representative of displayed contact information 200. Displayed contact information 400 may further comprise connection priority information indicator 402. Connection priority information indicator 402 may comprise a strikethrough of certain communication modes. For example, as shown in displayed contact information 400, Sarah Jones may currently be unavailable for an instant messaging communication mode and Bob Smith may currently be unavailable at his office telephone communication mode.

Figures 5, 6:
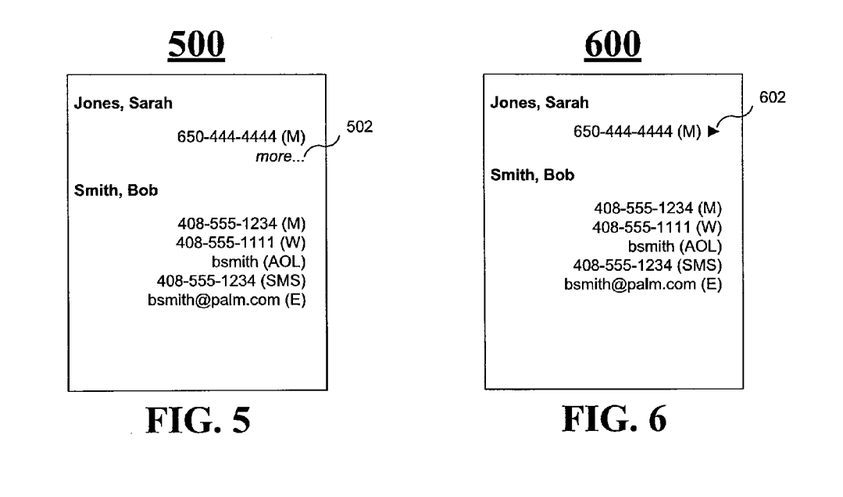
FIG. 5 illustrates a fourth embodiment of displayed contact information.
FIG. 6 illustrates a fifth embodiment of displayed contact information.

FIG. 5 illustrates a fourth embodiment of displayed contact information. FIG. 5 illustrates displayed contact information 500. As shown in FIG. 5, displayed contact information 500 may be similar to and representative of displayed contact information 200. Displayed contact information 500 may further comprise connection priority information indicator 502. As shown in displayed contact information 500, only a cellular radiotelephone communication mode is available for Sarah Jones. Connection priority information indicator 502 comprises text indicating that additional communication modes are available, but the displayed communication mode represents the highest priority communication mode currently being accepted by the destination device. For example, in displayed contact information 500, Sarah Jones may only be available for communications via her cellular radiotelephone communication mode.

In various embodiments, a user of displayed contact information 500 may initiate communication with a destination device using a communication mode not displayed by selecting the connection priority information indicator 502. For example, if a user desires to initiate an email communication mode with Sarah Jones, the user could select connection priority information indicator 502, thereby revealing the remaining communication modes available for Sarah Jones, including her email communication mode. As shown in displayed contact information 500, all of the available communication modes are displayed for Bob Smith. In this example, Bob Smith may be using a destination device that is not compatible with the various embodiments described herein or the mobile computing device may not be receiving connection information from the destination device. As a result, the contact information for Bob Smith does not include a connection priority information indicator.

FIG. 6 illustrates a fifth embodiment of displayed contact information. FIG. 6 illustrates displayed contact information 600. As shown in FIG. 6, displayed contact information 600 may be similar to and representative of displayed contact information 200. Displayed contact information 600 may further comprise connection priority information indicator 602. Connection priority information indicator 602 may comprise a symbol such as an arrow as shown in displayed contact information 600. Connection priority information indicator 602 may be available for user selection to indicate that a communication connection with a destination device is desired. For example, in displayed contact information 600 only a cellular radiotelephone communication mode is available for Sarah Jones indicating that a cellular radiotelephone communication mode is currently the highest priority communication mode being accepted. A user desiring to establish a connection with Sarah Jones could select connection priority information indicator 602 and the mobile computing device would initiate communication with the destination device using the displayed communication mode.

Figure 7:
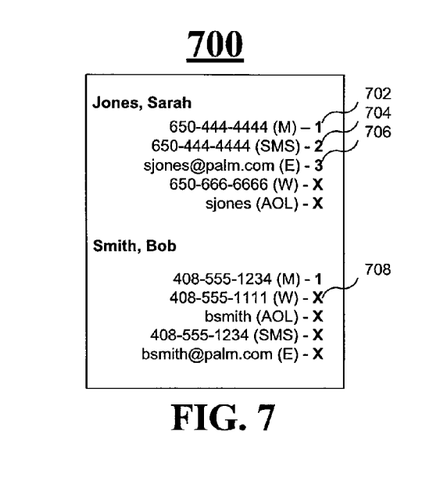
FIG. 7 illustrates a sixth embodiment of displayed contact information.

FIG. 7 illustrates a sixth embodiment of displayed contact information. FIG. 7 illustrates displayed contact information 700. As shown in FIG. 7, displayed contact information 700 may be similar to and representative of displayed contact information 200. Displayed contact information 700 may further comprise connection priority information indicators 702, 704, 706 and 708. Connection priority information indicators 702, 704, 706 and 708 may comprise text representing a priority level for the designated communication modes. For example, connection priority information indicator 702 may comprise the number one indicating that the cellular radiotelephone communication mode for Sarah Jones has the highest priority. Connection priority information indicator 704 may comprise the number two indicating that an SMS communication mode with Sarah Jones has the second highest priority. Connection priority information indicator 706 may comprise the number three indicating that an email communication mode has the third highest priority among the available communication modes. Connection priority information indicator 708 may comprise the letter X indicating that the designated communication mode is currently unavailable.

Although FIGS. 2-7 describe exemplary arrangements of displayed contact information, it may be appreciated that any desired number of contacts, communication modes and connection priority information indicators may be used. Furthermore, FIGS. 2-7 show a limited number and type of connection priority information indicators by way of example. Combinations of the above embodiments, and other embodiments not specifically described herein will be apparent to those of skill in the art upon reviewing the above description. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
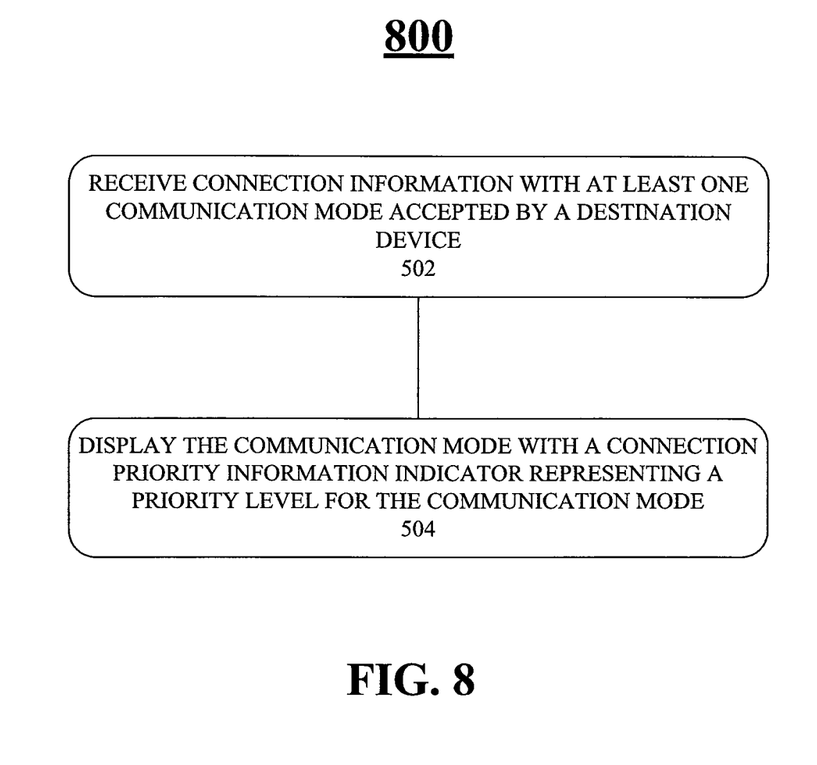
FIG. 8 illustrates one embodiment of a logic flow.

FIG. 8 illustrates one embodiment of a logic flow. FIG. 8 illustrates a logic flow 800. Logic flow 800 may be representative of the operations executed by one or more embodiments described herein. As shown in logic flow 800, connection information with at least one communication mode accepted by a destination device may be received at 802. At 804 the communication mode may be displayed with a connection priority information indicator representing a priority level for the communication mode.

Multiple communication modes may be arranged according to the connection priority information. For example, as shown in FIG. 7, the communication modes accepted by Sarah Jones are displayed in an order from the highest priority communication mode to the lowest priority communication mode.

Communication with the destination device may be initiated in response to operator instructions selecting a communication mode. For example, a user may select the cellular radiotelephone number for Bob Smith as shown in FIG. 4 from the list of available communication modes. In response, the mobile computing device may initiate communication with the cellular radiotelephone of Bob Smith. Communication with the destination device may also be initiated based on an automatic selection of a communication mode. For example, given the priority information for Sarah Jones shown in FIG. 5, the mobile computing device may automatically attempt to initiate communication with the cellular radiotelephone of Sarah Jones.

A communication mode may be selected based on connection priority information representing priority levels for multiple communication modes accepted by the destination device. For example, based on the priority information for Bob Smith shown in FIG. 7, the cellular radiotelephone communication mode will be selected because it has the highest priority of the available communication modes.

Initiation of communication with the destination device may be attempted using different communication modes until a communication connection is established. The order of attempted communication modes may be determined using the connection priority information. For example, as shown in FIG. 7, Sarah Jones may be available for communication via a cellular radiotelephone communication mode, SMS communication mode and email communication mode. Based on the priority information, communication with the destination device would first be attempted using the cellular radiotelephone communication mode. If this first attempt was unsuccessful, communication would be attempted using the SMS communication mode. These steps would continue in the defined order of priority until a successful communication connection with the destination device was established.

Contact information may be displayed on a display screen as shown in FIGS. 2-7. The contact information may include connection information having various communication modes accepted by the destination device. For example, as shown in FIG. 4, contact information for Bob Smith is displayed indicating that Bob Smith may currently be available via a cellular radiotelephone communication mode, instant messaging communication mode, SMS communication mode or email communication mode. Each communication mode may have a connection priority information indicator representing a priority level for the communication mode. As shown in FIG. 3, connection priority information indicators 302, 34, 306 and 308 represent different priority levels for the designated communication modes.

Figure 9:
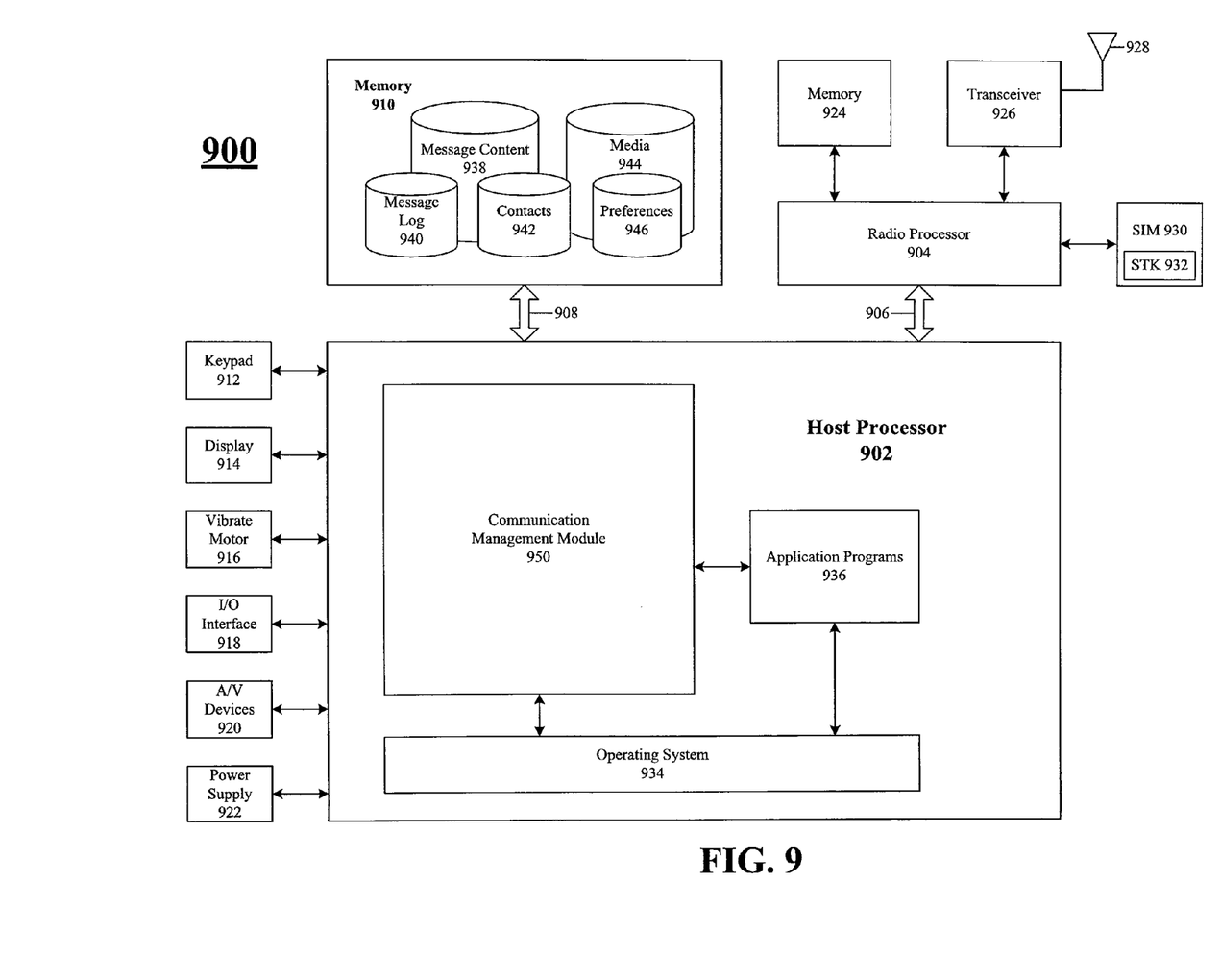
FIG. 9 illustrates one embodiment of a second mobile computing device.

FIG. 9 illustrates a block diagram of a mobile computing device 900 suitable for implementing various embodiments, including the mobile computing device 100. It may be appreciated that the mobile computing device 900 is only one example of a suitable mobile computing environment and is not intended to suggest any limitation as to the scope of use or functionality of the embodiments. Neither should the mobile computing device 900 be interpreted as having any dependency or requirement relating to any one or combination of components illustrated in the exemplary mobile computing device 900.

The mobile computing device 900 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 900 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 900 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 900 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 9, the mobile computing device 900 may comprise a dual processor architecture including a host processor 902 and a radio processor 904. In various implementations, the host processor 902 and the radio processor 904 may be arranged to communicate with each other using interfaces 906 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 902 may be responsible for executing various software programs such as system programs and applications programs to provide computing and processing operations for the mobile computing device 900. The radio processor 904 may be responsible for performing various voice and data communications operations for the mobile computing device 900 such as transmitting and receiving voice and data information over one or more wireless communications channels. Although the mobile computing device 900 is shown with a dual-processor architecture, it may be appreciated that the mobile computing device 900 may use any suitable processor architecture and/or any suitable number of processors in accordance with the described embodiments. In one embodiment, for example, the processors 902, 904 may be implemented using a single integrated processor.

The host processor 902 may be implemented as a host central processing unit (CPU) using any suitable processor or logic device, such as a as a general purpose processor. The host processor 902 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 902 may be coupled through a memory bus 908 to a memory 910. The memory bus 908 may comprise any suitable interface and/or bus architecture for allowing the host processor 902 to access the memory 910. Although the memory 910 may be shown as being separate from the host processor 902 for purposes of illustration, it is worthy to note that in various embodiments some portion or the entire memory 910 may be included on the same integrated circuit as the host processor 902. Alternatively, some portion or the entire memory 910 may be disposed on an integrated circuit or other medium (e.g., hard disk drive) external to the integrated circuit of the host processor 902. In various embodiments, the mobile computing device 900 may comprise an expansion slot to support a multimedia and/or memory card, for example.

The memory 910 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 900 may comprise an alphanumeric keypad 912 coupled to the host processor 902. The keypad 912 may comprise, for example, a QWERTY key layout and an integrated number dial pad. The mobile computing device 900 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 912 may comprise a physical keypad using hard buttons, or a virtual keypad using soft buttons displayed on a display 914.

The mobile computing device 900 may comprise a display 914 coupled to the host processor 902. The display 914 may comprise any suitable visual interface for displaying content to a user of the mobile computing device 900. In one embodiment, for example, the display 914 may be implemented by a liquid crystal display (LCD) such as a touch-sensitive color (e.g., 96-bit color) thin-film transistor (TFT) LCD screen. The touch-sensitive LCD may be used with a stylus and/or a handwriting recognizer program.

The mobile computing device 900 may comprise a vibrate motor 916 coupled to the host processor 902. The vibrate motor 916 may be enable or disabled according to the preferences of the user of the mobile computing device 900. When enabled, the vibrate motor 916 may cause the mobile computing device 900 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 900 may comprise an input/output (I/O) interface 918 coupled to the host processor 902. The I/O interface 918 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 900 may be arranged to synchronize information with a local computer system.

The host processor 902 may be coupled to various audio/video (A/V) devices 920 that support A/V capability of the mobile computing device 900. Examples of A/V devices 920 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 902 may be coupled to a power supply 922 arranged to supply and manage power to the elements of the mobile computing device 900. In various embodiments, the power supply 922 may be implemented by a rechargeable battery, such as a removable and rechargeable lithium ion battery to provide direct current (DC) power, and/or an alternating current (AC) adapter to draw power from a standard AC main power supply.

The radio processor 904 may be arranged to communicate voice information and/or data information over one or more assigned frequency bands of a wireless communication channel. The radio processor 904 may be implemented as a communications processor using any suitable processor or logic device, such as a modem processor or baseband processor. The radio processor 904 may also be implemented as a digital signal processor (DSP), media access control (MAC) processor, or any other type of communications processor in accordance with the described embodiments. The radio processor 904 may perform analog and/or digital baseband operations for the mobile computing device 900. For example, the radio processor 904 may perform digital-to-analog conversion (DAC), analog-to-digital conversion (ADC), modulation, demodulation, encoding, decoding, encryption, decryption, and so forth.

The mobile computing device 900 may comprise a memory 924 coupled to the radio processor 904. The memory 924 may be implemented using any of the computer-readable media described with reference to the memory 910. The memory 924 may be typically implemented as flash memory and secure digital (SD) RAM. Although the memory 924 may be shown as being separate from the radio processor 904, some or all of the memory 924 may be included on the same IC as the radio processor 904.

The mobile computing device 900 may comprise a transceiver module 926 coupled to the radio processor 904. The transceiver module 926 may comprise one or more transceivers arranged to communicate using different types of protocols, communication ranges, operating power requirements, RF sub-bands, information types (e.g., voice or data), use scenarios, applications, and so forth. In various embodiments, the transceiver module 926 may comprise one or more transceivers arranged to support voice communications and/or data communications for the wireless network systems or protocols as previously described. In some embodiments, the transceiver module 926 may further comprise a Global Positioning System (GPS) transceiver to support position determination and/or location-based services.

The transceiver module 926 generally may be implemented using one or more chips as desired for a given implementation. Although the transceiver module 926 may be shown as being separate from and external to the radio processor 904 for purposes of illustration, it is worthy to note that in various embodiments some portion or the entire transceiver module 926 may be included on the same integrated circuit as the radio processor 904. The embodiments are not limited in this context.

The mobile computing device 900 may comprise an antenna system 928 for transmitting and/or receiving electrical signals. As shown, the antenna system 928 may be coupled to the radio processor 904 through the transceiver module 926. The antenna system 928 may comprise or be implemented as one or more internal antennas and/or external antennas.

The mobile computing device 900 may comprise a subscriber identity module (SIM) 930 coupled to the radio processor 904. The SIM 930 may comprise, for example, a removable or non-removable smart card arranged to encrypt voice and data transmissions and to store user-specific data for allowing a voice or data communications network to identify and authenticate the user. The SIM 930 also may store data such as personal settings specific to the user. In some embodiments, the SIM 930 may be implemented as an UMTS universal SIM (USIM) card or a CDMA removable user identity module (RUIM) card. The SIM 930 may comprise a SIM application toolkit (STK) 932 comprising a set of programmed commands for enabling the SIM 930 to perform various functions. In some cases, the STK 932 may be arranged to enable the SIM 930 to independently control various aspects of the mobile computing device 900.

As mentioned above, the host processor 902 may be arranged to provide processing or computing resources to the mobile computing device 900. For example, the host processor 902 may be responsible for executing various software programs including system programs such as operating system (OS) 934 and application programs 936. System programs generally may assist in the running of the mobile computing device 900 and may be directly responsible for controlling, integrating, and managing the individual hardware components of the computer system. The OS 934 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 900 may comprise other system programs such as device drivers, programming tools, utility programs, software libraries, application programming interfaces (APIs), and so forth.

Application programs 936 generally may allow a user to accomplish one or more specific tasks. In various implementations, the application programs 936 may provide one or more graphical user interfaces (GUIs) to communicate information between the mobile computing device 900 and a user. In some embodiments, application programs 936 may comprise upper layer programs running on top of the OS 934 of the host processor 902 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 936 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 900 may implement other types of applications in accordance with the described embodiments.

The mobile computing device 900 may include various databases implemented in the memory 910. For example, the mobile computing device 900 may include a message content database 938, a message log database 940, a contacts database 942, a media database 944, a preferences database 946, and so forth. The message content database 938 may be arranged to store content and attachments (e.g., media objects) for various types of messages sent and received by one or more messaging applications. The message log 940 may be arranged to track various types of messages which are sent and received by one or more messaging applications. The contacts database 942 may be arranged to store contact records for individuals or entities specified by the user of the mobile computing device 900. The media database 944 may be arranged to store various types of media content such as image information, audio information, video information, and/or other data. The preferences database 946 may be arranged to store various settings such as rules and parameters for controlling the operation of the mobile computing device 900.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. .sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A mobile computing device, comprising:
 a communication management module to:
  receive connection information from a destination device, the connection information comprising a plurality of communication modes accepted by the destination device and connection priority information indicative of a level of acceptance of each communication mode of the plurality of communication modes, wherein the level of acceptance of a communication mode of the plurality of communication modes indicates a likelihood of successfully initially establishing a communication session, using the communication mode, with a user of the destination device, wherein the connection priority information comprises information representative of a context of the destination device when the connection information was transmitted from the destination device, and wherein the context of the destination device includes context selected from the group consisting of a location of the destination device and calendar information of the destination device;

set a priority level for each communication mode based upon the connection priority information;

display the plurality of communication modes on a display of the mobile computing device, each communication mode of the plurality of communication modes having a connection priority information indicator indicative of the priority level for each communication mode; and automatically attempt to initiate communication with the destination device using different communication modes of the plurality of communication modes until a communication connection is established, wherein the automatically attempting to initiate communication with the destination device includes automatically selecting a communication mode from the plurality of communication modes and initiating communication with the destination device based on the automatic selection, an order of attempted communication modes determined using the connection priority information.

2. The mobile computing device of claim 1, the plurality of communication modes arranged on the display according to the priority level for each communication mode.

3. The mobile computing device of claim 2, the communication management module to initiate communication with the destination device in response to operator instructions selecting a communication mode.

4. The mobile computing device of claim 1, the automatic selection comprising selection of a communication mode with a highest priority determined from connection priority information.

5. The mobile computing device of claim 1, the plurality of communication modes including at least one of a cellular radiotelephone connection, email connection, instant message (IM) connection, chat connection, group chat connection, short message service (SMS) connection, multimedia message service (MMS) connection, data connection, personal area network (PAN) connection, local area network (LAN) connection, metropolitan area network (MAN) connection, or wide area network (WAN) connection.

6. The mobile computing device of claim 1, comprising an application program operative to manage and display contact information, the contact information to include connection information having various communication modes accepted by the destination device, each communication mode having a connection priority information indicator representing a priority level for the communication mode.

7. The mobile computing device of claim 1, comprising a graphic user interface (GUI) to display a GUI view with plurality of communication modes on a display of the mobile computing device.

8. A method, comprising:
receiving connection information with a plurality of communication modes accepted by a destination device;
receiving connection priority information indicative of a level of acceptance of each communication mode of the plurality of communication modes, wherein the level of acceptance of a communication mode of the plurality of communication modes indicates a likelihood of successfully initially establishing a communication session, using the communication mode, with a user of the destination device, wherein the connection priority information comprises information representative of a context of the destination device when the connection priority information was transmitted from the destination device, and wherein the context of the destination device includes context selected from the group consisting of a location of the destination device and calendar information of the destination device;
setting a priority level for each communication mode based upon the connection priority information;
displaying the plurality of communication modes with a connection priority information indicator representing the priority level for each communication mode; and
automatically attempting to initiate communication with the destination device using different communication modes of the plurality of communication modes until a communication connection is established, wherein the automatically attempting to initiate communication with the destination device includes automatically selecting a communication mode from the plurality of communication modes and initiating communication with the destination device based on the automatic selection, an order of attempted communication modes determined using the connection priority information.

9. The method of claim 8, comprising:
initiating communication with the destination device in response to operator instructions selecting a communication mode.

10. The method of claim 8, comprising:
displaying contact information on a display screen, the contact information to include connection information having various communication modes accepted by the destination device, each communication mode having a connection priority information indicator representing a priority level for the communication mode.

11. An article of manufacture comprising a non-transitory computer-readable storage medium containing instructions that if executed enable a system to:
receive connection information with a plurality of communication modes accepted by a destination device;
receive connection priority information indicative of a level of acceptance of each communication mode of the plurality of communication modes, wherein the level of acceptance of a communication mode of the plurality of communication modes indicates a likelihood of successfully initially establishing a communication session, using the communication mode, with a user of the destination device, wherein the connection priority information comprises information representative of a context of the destination device when the connection priority information was transmitted from the destination device, and wherein the context of the destination device includes context selected from the group consisting of a location of the destination device and calendar information of the destination device;

set a priority level for each communication mode based upon the connection priority information;

display the plurality of communication modes with a connection priority information indicator representing the priority level for each communication mode; and automatically attempt to initiate communication with the destination device using different communication modes of the plurality of communication modes until a communication connection is established, wherein the automatically attempting to initiate communication with the destination device includes automatically selecting a communication mode from the plurality of communication modes and initiating communication with the destination device based on the automatic selection, an order of attempted communication modes determined using the connection priority information.

12. The article of claim 11, further comprising instructions that if executed enable the system to:

initiate communication with the destination device in response to operator instructions selecting a communication mode.

13. The article of claim 11, further comprising instructions that if executed enable the system to:

display contact information on a display screen, the contact information to include connection information having various communication modes accepted by the destination device, each communication mode having a connection priority information indicator representing a priority level for the communication mode.

14. An apparatus for wireless communication, comprising:

means for receiving connection information with a plurality of communication modes accepted by a destination device;

means for receiving connection priority information indicative of a level of acceptance of each communication mode of the plurality of communication modes, wherein the level of acceptance of a communication mode of the plurality of communication modes indicates a likelihood of successfully initially establishing a communication session, using the communication mode, with a user of the destination device, wherein the connection priority information comprises information representative of a context of the destination device when the connection information was transmitted from the destination device, and wherein the context of the destination device includes context selected from the group consisting of a location of the destination device and calendar information of the destination device;

means for setting a priority level for each communication mode based upon the connection priority information;

means for displaying the plurality of communication modes with a connection priority information indicator representing the priority level for each communication mode; and means for automatically attempting to initiate communication with the destination device using different communication modes of the plurality of communication modes until a communication connection is established, wherein the means for automatically attempting to initiate communication with the destination device includes means for automatically selecting a communication mode from the plurality of communication modes and initiating communication with the destination device based on the automatic selection, an order of attempted communication modes determined using the connection priority information.

* * * * *